Aug. 6, 1968  YUZO NAKAZAWA  3,396,327
THICKNESS SHEAR VIBRATION TYPE, CRYSTAL
ELECTROMECHANICAL FILTER
Filed Dec. 3, 1962                              3 Sheets-Sheet 1
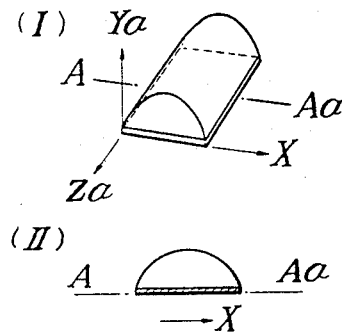
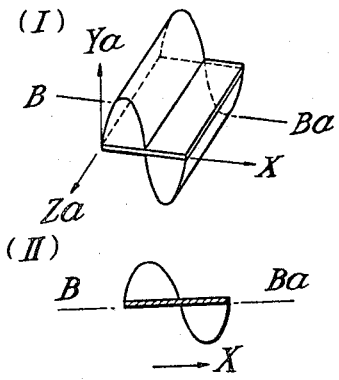
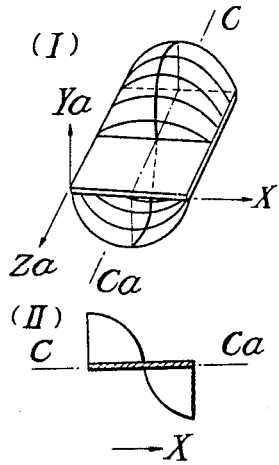
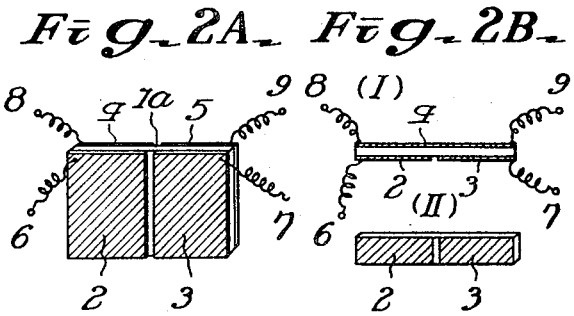
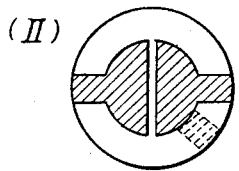
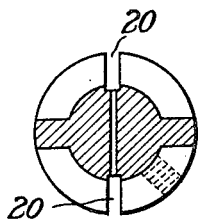

United States Patent Office 3,396,327
Patented Aug. 6, 1968

3,396,327
THICKNESS SHEAR VIBRATION TYPE, CRYSTAL ELECTROMECHANICAL FILTER
Yuzo Nakazawa, Kohoku-ku, Yokohama-shi, Kanagawa-ken, Japan, assignor to Toyotsushinki Kabushiki Kaisha, Tsukakoshi, Kawasaki-shi, Japan, a joint-stock company of Japan
Filed Dec. 3, 1962, Ser. No. 241,747
Claims priority, application Japan, Dec. 27, 1961, 36/47,189
6 Claims. (Cl. 333—72)

ABSTRACT OF THE DISCLOSURE

A high frequency electromechanical band pass filter comprises a thin piezoelectric crystal having an X-axis (electrical axis), Y-axis (mechanical axis) and Z-axis (optical axis) and having the characteristic of vibrating in the thickness shear mode of vibration with substantially all vibrational displacements in the X-axis direction. The crystal has parallel major faces and a plurality of electrodes on the major faces of the crystal. The electrodes comprise an input electrode and output electrode on the same face divided from one another along a center line perpendicular to the X-axis with parallel edges of the electrodes spaced from one another. The crystal may be circular with the electrodes semicircular and of lesser radius than the crystal. Notches provided in the perimeter of the crystal in line with the division between the electrodes preferably extend into the perimeter of the electrodes.

---

This invention relates to electromechanical filters, and more particularly it relates to a new thickness shear vibration type, crystal electromechanical filter having highly advantageous characteristics.

In general, an electromechanical filter comprises an electromechanical transducer which converts electrical energy into mechanical energy, a mechanical filter which filters the converted mechanical energy, and an electromechanical transducer which converts the filtered transmission energy into electrical energy.

It is an object of the present invention to provide a new crystal electromechanical filter of the so-called high-frequency type operating in a frequency range of from several to several tens of megacycles per second, wherein is used, for the above-mentioned elements, a piezoelectric quartz crystal unit, its characteristic of functioning also as an electromechanical transducer being utilized, and wherein a thickness shear vibration mode suitable for high frequencies is used.

The so-called AT and BT cut crystal vibrators with zero temperature coefficients have, in general, numerous possible resonance frequencies. Of these, two modes of vibrations are principally used. The frequencies of vibration produced by the thickness shear mode are not affected substantially by the shape and dimensions of the plate, although the crystal plate may be given a variety of shapes, rectangle, square, circle, rhombus, etc., and its resonance frequency gradually increases with decreasing dimensions. On the other hand, in the case of the so-called "higher flexural mode," its resonance frequency is seriously affected by the shape and dimensions of the plate, increasing abruptly with decreasing dimensions.

The crystal electromechanical filter of the character to which this invention relates, is based on two particular vibrations of the thickness shear vibratiton modes.

The principle and nature of the inventiton will be more clearly apparent by reference to the following detailed description when taken in conjunction with the accompanying drawings in which:

FIG. 1 consists of views for describing thickness shear vibration modes of crystal vibrators, wherein FIG. 1(A) presents views indicating the electrical polarization distribution of the main vibration, and FIG. 1(B) and FIG. 1(C) present views indicating the electrical polarization distributions of vibrations utilized in the filter and indicating the principle of the invention; and wherein, in each of FIG. 1(A), 1(B), and 1(C), (I) is a perspective view, and (II) is a cross sectional view;

FIG. 2(A) is a perspective view showing one embodiment of the present invention;

FIG. 2(B) I and FIG. 2(B) II show, respectively, plan view and perspective view of another embodiment of the present invention;

FIG. 2(C) II, FIG. 2(D), and FIG. 2(E) are, respectively, plan views of the other embodiments of the present invention;

FIG. 2(C) I is a side view of the embodiment of FIG. 2(C) II;

FIG. 3(A)–FIG. 3(E) are electrical connection diagrams showing, respectively, equivalent circuits of thickness shear vibration, crystal electromechanical filters wherein the principle of the invention is utilized;

Figure 3A:
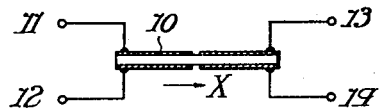

Now referring to the accompanying drawing, the principle of operation will be described in detail. In FIG. 1 which shows views of vibrational displacement in thickness shear mode with a rectangular plate taken as an example, the thin crystal plate has its sides on X-axis and Z-axis. The X-axis in the figure corresponds to the crystallographic X-axis (electrical axis) of the crystal, and the $Z_a$-axis in the figure is somewhat deviated from the crystallographic Z-axis (optical axis) of the crystal. This angle of deviation, $Z-Z_a$, represents cutting orientation, and although varying slightly with dimensions and frequency, it is $35°15'$ and $-49°$, respectively, for AT cut and BT cut, well known as the cut angles of zero temperature coefficient. Experimentally, it happens sometimes that a vibration of shorter wave is superposed upon the electrical polarization distribution of thickness shear mode shown in FIG. 1, and this is due to the mechanical coupling of the afore-mentioned higher flexural vibration with the so-called thickness shear vibration. However, as is apparent by macroscopic observation, the X-axis direction has several sine waves and the $Z_a$-axis direction perpendicular to the plane of the X-axis has several cosine waves (one cosine wave shown in FIG. 1(C)) or an approximately uniform electrical polarization distribution. Vibrations of FIG. 1(A) and (B) correspond to zero cosine wave distribution. In other words, all these vibrations are essentially the same thickness shear vibrations, but numerous frequency vibrations may appear with different combinations of several sine waves distributed in the X-axis direction and several cosine waves distributed in the $Z_a$-axis direction. FIG. 1 shows three-dimensional representations of the distributions of these components, that in the case of FIG. 1(A) being semi-circular.

This electrical polarization distribution is similar to the vibrational displacement distribution. The thickness shear vibration is a pure shear vibration, with substantially all vibrational displacements in the X-axis direction. The displacement has sine wave form in the X-axis direction and cosine wave form in the $Z_a$-axis direction.

The $Y_a$-axis in the figure (mechanical axis) lies in a direction which is determined by the frequency required, that is, the thickness direction of the crystal plate. So far as the fundamental frequency is concerned, the thickness dimension is determined uniquely. The vibrational displacement in the $Y_a$-axis direction shows one cosine wave distribution.

From the foregoing description, it will be seen that the vibration of FIG. 1(A) has a vibration displacement distribution with one sine wave in the X-axis direction, one cosine wave in the $Y_a$-axis direction, and zero cosine wave in the $Z_a$-axis direction. This fundamental thickness-shear mode will be denoted by the symbol (1.1.0). Following a similar notation, the inharmonic thickness-shear mode of FIG. 1(B) and (C) can be expressed as (2.1.0) and (1.1.1), respectively. It will be obvious that numerous vibrations of other modes are conceivable, but in the general crystal oscillators which are excited in thickness direction, it is possible for some to occur and not possible for others to occur, depending upon the condition in which electrodes are attached. Generally speaking, a crystal vibrator has electrodes attached over the entire surface or partially on the central area, and, therefore, its excitation for a vibrational distribution with even number of sine waves in all X-axis, $Y_a$-axis and $Z_a$-axis directions is impossible or difficult. Vibrations of odd order appear then as unwanted response, in general.

Resonance frequencies of the above-mentioned thickness shear vibrations will now be examined. As is well known, equations of motion are as follows:

$$\frac{\partial X_x}{\partial x}+\frac{\partial X_y}{\partial y}+\frac{\partial X_z}{\partial z}=\rho\frac{\partial^2 u}{\partial t^2}$$
$$\frac{\partial Y_x}{\partial x}+\frac{\partial Y_y}{\partial y}+\frac{\partial Y_z}{\partial z}=\rho\frac{\partial^2 v}{\partial t^2}$$
$$\frac{\partial Z_x}{\partial x}+\frac{\partial Z_y}{\partial y}+\frac{\partial Z_z}{\partial z}=\rho\frac{\partial^2 w}{\partial t^2} \quad (1)$$

where $X_x$, $X_y$ and $Z_z$ are the stresses, $\rho$ is the density, $u$, $v$ and $w$ are the displacements in the X-axis and $Z_a$-axis directions, and $t$ is time. The displacements are considered to have sine wave form in the X-axis direction and cosine wave form in the $Y_a$- and $Z_a$-axis directions, as mentioned above, and can be expressed as $$u = A \cdot \sin \alpha x \cdot \cos \beta y \cdot \cos \gamma z \cdot e^{j\omega t}$$
$$v = B \cdot \cos \alpha x \cdot \sin \beta y \cdot \cos \gamma z \cdot e^{j\omega t} \quad (2)$$
$$w = C \cdot \cos \alpha x \cdot \cos \beta y \cdot \sin \gamma z \cdot e^{j\omega t}$$

where A, B and C are the constants of integration, independent of position and time. Since the boundary condition in that external force is zero at $x=x_0$, $y=y_0$ and $z=z_0$, $$\alpha = p\frac{\pi}{x_0}$$
$$\beta = q\frac{\pi}{y_0}$$
$$\gamma = r\frac{\pi}{z_0} \quad (3)$$

where $p$, $q$ and $r$ are positive integers, and $x_0$, $y_0$ and $z_0$ are the dimensions of the crystal plate in the X-axis, $Y_a$-axis and $Z_a$-axis directions, respectively. The numbers, $p$, $q$, and $r$, correspond to the numbers of the afore-mentioned sine and cosine waves, and $p=1$, $q=1$ and $r=0$ for the mode (1.1.0). For the condition $y_0 \ll x_0$, $z_0$, and also for the close proximity of the main thickness shear vibration, the resonance frequencies can be expressed from the foregoing equations approximately as $$f = \frac{1}{2}\left[\frac{C'_{66}}{\rho}\right]^{1/2}\left[\frac{C'_{11}}{C'_{66}}\left(\frac{p}{x_0}\right)^2 + \left(\frac{q}{y_0}\right)^2 + \frac{C'_{55}}{C'_{66}}\left(\frac{r}{z_0}\right)^2\right]^{1/2} \quad (4)$$

where $C'_{11}$, $C'_{55}$ and $C'_{66}$ are the adiabatic elastic constants of the crystal when it is deflected. Thus, numerous frequencies of thickness shear vibration modes are determined. Of these frequencies of unlimited number, two particular frequencies are utilized for use in the band pass filter as an embodiment of this invention.

FIG. 2(A) to FIG. 2(E) show examples of construction of a few crystal mechanical filters according to the invention. The rectangular plate form of FIG. 2(A), which has the simplest construction, consists of electrodes plated on both surfaces of a crystal plate 1, electrodes 2 and 3 being formed on one surface in positions opposite electrodes 4 and 5 formed on the opposite surface in the case illustrated. The electrodes may be plated onto the crystal plate 1 by any of such methods as a vacuum evaporation method or a chemical plating method.

The electrode plates are formed over the entire surface of the crystal plate or in any desired form, for instance, a circle or a rectangle, and divided into two parts with proper attention to such considerations as the equivalent inductance to be described hereinafter and suppression of unwanted vibration. At the corners of the electrodes, by attaching silver points by a baking method or by the clip mount method, lead wires 6, 7, 8, and 9 are formed. These lead wires are adapted to maintain electrode conductivity and, at the same time, to serve as support wires. These lead wires 6, 7, 8 and 9 are made to be the terminals, 11, 12, 13 and 14 shown in FIG. 3(A), and the crystal plate 10 is made to be the afore-mentioned crystal vibrator. The direction of vibration, that is, the X-axis direction, is made to coincide with the transmission direction, the input terminals being 11 and 12, and the output terminals being 13 and 14. The electrodes are divided along a center line in the direction perpendicular to the direction of vibration.

Figure 3B:
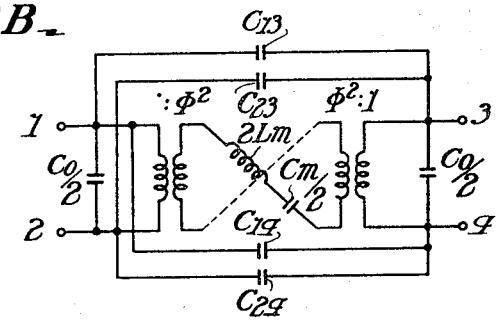
Figure 3C:
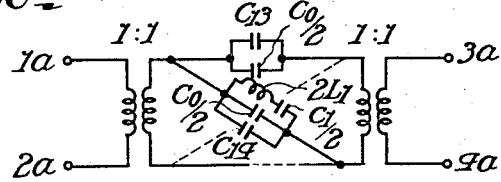

The equivalent electrical circuit of this crystal vibrator will now be considered, beginning first with the fundamental thickness-shear mode (1.1.0), which, as described above, has one sine wave in the X-axis direction and uniform distribution in the $Z_a$-axis direction. Terminals 11, 12, 13, and 14 in FIG. 3(A) are assumed to be represented by 1, 2, 3, and 4 in FIG. 3(B). Then, the equivalent circuit is found to comprise: electrical capacitance $C_0$ (capacitance of crystal plate regarded as a dielectric material); $C_{13}$, $C_{14}$, $C_{23}$, $C_{24}$ (capacitances between terminals 1 and 3, 1 and 4, 2 and 3, and 2 and 4); an electromechanical transducer $1:\phi^2$ (where $\phi$ is the electromechanical conversion factor), and mechanically equivalent mass $L_m$ and stiffness $C_m$. If the mechanical constants, $L_m$ and $C_m$, are transformed into electrical constants, $L_1$ and $C_1$, the transducer $1:\phi^2$ is transformed into an ideal transformer $1:1$, and input terminals $1a$ and $2a$ and output terminals $3a$ and $4a$ are newly established, this circuit may be transformed into an equivalent, purely electrical circuit of lattice type as shown in FIG. 3(C). Here, $L_1$ and $C_1$ are the most important elements in the design of the filter according to this invention and are determined by the dimensions of the vibrator and also by the spatial distribution of electrodes on the vibrator surface. That is, with a vibration mode of (1.1.0), and a crystal plate of dimensions $x_0$, $y_0$, and $z_0$. The equivalent inductance $L_1$ may be expressed as $$L_1 = \frac{\rho \pi^2}{64 \epsilon'^2} \frac{y_0^3}{x_0 z_0} \quad (5)$$

where $\epsilon'$ denotes the piezo-electric modulus of the deflected crystal. If the electrode plate is formed partially, for instance, from $x_2$ to $x_1$ in the X direction and from $z_2$ to $z_1$ in the Z direction, the equivalent inductance $L_2$ is given as $$L_2 = \left| \frac{\rho \pi^2}{64 \epsilon'^2} \frac{y_0^3}{(z_2-z_1)^2} \cdot \frac{1}{\left[\sin \frac{\pi}{2} \frac{(x_1+x_2)}{x_0} \cdot \sin \frac{\pi}{2} \frac{(x_2-x_1)}{x_0}\right]^2} \right| \quad (6)$$

from which it can be seen this equivalent inductance varies with the electrode distribution and crystal size.

Figure 3D:
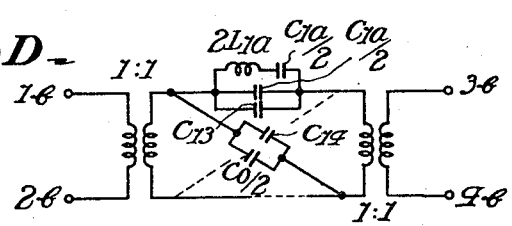

Next, the inharmonic thickness-shear mode (2.1.0) shown in FIG. 1(B), which has two sine waves in the X-axis direction and uniform distribution in the $Z_a$-axis direction will be assumed for the instant vibrator. For the general vibrator, excitation in this mode is impossible or difficult, whereas, for the resonator according to this invention, in which each electrode plate is divided into two parts, and the electric charges on the respective vibrating surfaces are separately led out, it is found, by the same consideration as for FIG. 1(A), that the (2.1.0) mode vibration is possible with the phase of output terminals 3 and 4 in anti-phase with respect to the previous case. This fact is an important condition as will be described hereinafter. The equivalent electrical circuit is a lattice type circuit which comprises equivalent inductance $L_1a$ and equivalent capacitance $C_1a$, both derived from the resonator, capacitances $C_0$, $C_{13}$, $C_{14}$, $C_{23}$, and $C_{24}$, all exactly the same as those for the previous case, and an ideal transformer 1:1, with input terminals 1b and 2b and output terminals 3b and 4b as shown in FIG. 3(D).

The equivalent inductance $L_1a$ and the equivalent capacitance $C_1a$ are calculated in the same manner as described for the previous case. If each electrode plate is attached over the entire crystal surface and divided into two parts, the parts carrying the same electric charges, that is, the terminals 11 and 14 and terminals 12 and 13 of FIG. 3(A) are connected together, respectively, to form a two-terminal network. The equivalent constants $L_1a$ and $C_1a$ thus calculated have approximately the same values as calculated by Eq. 5. This fact also is an important condition as will be described hereinafter and makes a symmetrical lattice type band pass filter feasible.

The two modes of vibrations so far described are, in effect, present in one and the same vibrator, and, therefore, the input terminals 1a and 2a and the output terminals 3a and 4a for one vibration are essentially the same as 1b and 2b and 3b and 4b, for the other. Thus, by considering only the two modes of vibration, the two equivalent electrical circuits derived above can be combined to form the circuit shown in FIG. 3(E).

Figure 3E:
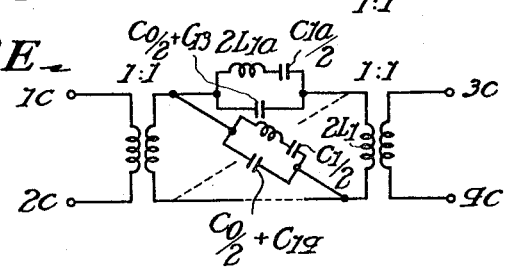

FIG. 3(E) represents a lattice circuit type band pass filter. If the impedance of a series arm comprising $2L_1a$, $C_1a/2$, and $C_0/2+C_{13}$ and the impedance of a lattice arm comprising $2L_1$, $C_1/2$ and $C_0/2+C_{14}$ are denoted by $Z_A$ and $Z_B$, respectively, the image transfer constant, the image impedance and the characteristic function are given by respectively the following well-known equations $$\tan h\frac{\theta}{2} = \sqrt{\frac{Z_B}{Z_A}} \tag{7}$$

$$Z_0\sqrt{Z_A \cdot Z_B} \tag{8}$$

$$\varphi = \frac{Z_A \cdot Z_B - 1}{Z_B - Z_A} \tag{9}$$

A point of zero attenuation, which satisfies $Z_A \cdot Z_B = 1$, is the ideal pass point, and inside the pass band, at least $Z_A$ and $Z_B$ should have dissimilar signs. Also, a point of infinite attenuation satisfies $Z_A = Z_B$, and inside the attenuation region, $Z_A$ and $Z_B$ should be of the same sign. By the application of the reactance theorem, $Z_A$ and $Z_B$ are then expressed as:

$$Z_A = j\omega H_1 \frac{\omega^2 - \omega^2\alpha}{\omega^2(\omega^2 - \omega^2_1)} \tag{10}$$

$$Z_B = j\omega H_2 \frac{\omega^2 - \omega^1_{-1}}{\omega^2(\alpha^2 - \omega^2\alpha)} \tag{11}$$

where $H_1$ and $H_2$ are constants, $\omega$ is the angular frequency, $\omega_1$ is the upper cut-off angular frequency and $\omega_{-1}$ is the lower cut-off angular frequency, that is, $\omega_{-1} < \alpha < \omega_1$. The pass band width $\Delta$ is given by:

$$\Delta = \omega_1 - \omega_{-1} \tag{12}$$

With reference to FIG. 3 (E), the required band pass filter will be obtained if $Z_A$ and $Z_B$ correspond to Eqs. 10 and 11, $\omega_{-1}$ to the resonance frequency of $L_1C_1$, $\omega_{-1}$ to the anti-resonance frequency of $Z_B$ and resonance frequency of $L_1aC_1a$, and $\omega_1$ to the anti-resonance frequency of $Z_A$. For the fundamental thickness-shear mode (1.1.0), the resonance frequency of $L_1C_1$ is obtained by placing $p=1$, $q=1$ and $r=0$ in Eq. 4, as mentioned hereinbefore. For the resonance frequency of $L_1aC_1a$, the vibration mode (2.1.0) is utilized, and this frequency is obtained by placing $p=2$, $q=1$ and $r=0$ in Eq. 4. The results are:

$$\omega^2_{-1} = \frac{1}{L_1C_1}, \omega^2_a = \frac{1}{L_1aC_1a} \tag{13}$$

Then, $\omega_a - \omega_{-1}$ determines ½ of the band width of the symmetrical lattice type band pass filter. Since, however, the two resonance frequencies, as evident from Eqs. 7 through 11, have no other resonance frequency in between, the resonator uses only the vibrations of adjacent resonance frequencies. In other words, the resonance frequency of the fundamental thickness-shear mode (1.1.0) and the resonance frequency of the inharmonic thickness-shear mode (2.1.0) could be two adjacent resonance frequencies determined by dimensions or special method of fabrication, and their difference becomes ½ of the so-called band width. If this difference is denoted by B, it is given as:

$$B = f_{210} - f_{110} \doteq \frac{3}{2} \cdot \frac{C'_{11}}{C'_{66}} \cdot \left(\frac{y_0}{x_0}\right)^2 \cdot f_{110} \tag{14}$$

where $f_{210}$ and $f_{110}$ are the resonance frequencies of vibration modes (2.1.0) and (1.1.0), respectively. The dimension $y_0$ is determined by the required center frequency, while $x_0$ can be designed according to the required band width, as seen in the equation above.

While in the above disclosure, vibrations of (1.1.0) and (2.1.0) modes were described, analysis in exactly the same manner can be made relative to the vibration of (1.1.1) mode shown in FIG. 1(C). For instance, if the vibration of (1.1.0) mode and the vibration of (1.1.1) mode are used, it is obvious from the foregoing description that the (1.1.1) vibration has an anti-phase relationship with respect to the (1.1.0) vibration.

In this case, it will be obvious that the dividing direction of the electrode is different from that in the previous case, and the electrode plate should be divided in the $Z_a$-axis direction into two parts in accordance with the distribution of electric charge.

Figure 4A:
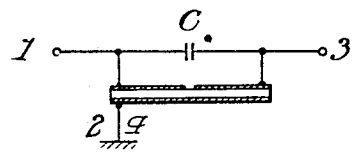
FIG. 4(A) shows a schematic electrical connection diagram indicating the composition of a polarized bandpass filter through the combination of electrical elements and the electromechanical filter of the invention.
Figure 4B:
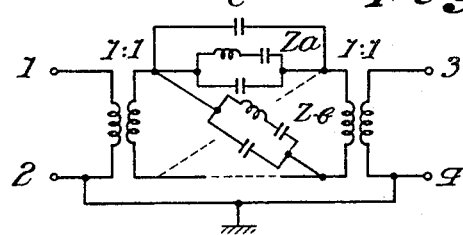
FIG. 4(B) shows an equivalent connection diagram of the embodiment of FIG. 4(A)

As mentioned above, a band pass filter can be constructed by using a single vibrator, and the filter thus constructed is of a constant K type in which the attenuation pole, that is, the infinite attenuation point, is extremely remote, as given by Eq. 9 owing to $L_1 \doteq L_1a$ and $C_{13} = C_{14}$. However, by the procedure as described below, it is possible to obtain a polarized type band pass filter in which the attenuation pole is brought nearer to the cut-off region. FIG. 4(A) shows the same resonator as described before, except that two electrodes on one side are connected to a common terminal 2–4, while the other two are connected to input terminal 1 and output terminal 3, separately. Combining two electrodes on one side into one results in a three-terminal resonator, which can be fabricated relatively easily. In this case, a capacitance C is inserted between input terminal 1 and output terminal 3. The same relation is obtained also when, in the four-terminal circuit of FIG. 3(C) a capacitance is inserted between the terminals 1a and 3a. The equivalent electrical circuit is shown in FIG. 4(B), where C is inserted in parallel with $Z_A$ in the series arm.

The attenuation characteristic can be calculated in the following manner. First the following will be considered:

$$\Omega = \frac{\omega - \omega_0}{\omega_0}, \quad P = \frac{C_0/2 + C_{13}}{C_{1a}/2} = \frac{C_0/2 + C_{14}}{C_1/2}$$

$$\Delta C = \frac{C}{C_{0/2} + C_{14}}$$

$$\Delta = \omega_1 - \omega_{-1} \tag{15}$$

Then, for the region where $$\frac{\Delta}{\omega_0} \ll 1$$

and for $\omega$ in the vicinity of $\omega_0$, $$\Delta C = \frac{1}{2P^2 \Omega_\infty{}^2 - 1} \tag{16}$$

whereby an attenuation pole is produced at a point of $\Omega_\infty$, and the attenuation at this time, from Eq. 9, becomes $$b = 10 \log_{10} \left[ 1 + \frac{4(2P\Omega)^2 (1+\Delta C)^2 \{(2P\Omega)^2 + (2P^2\Omega^2 - 1)(1+\Delta C)\}^2}{\{1+\Delta C - (2P\Omega)^2 \Delta C\}^2} \right] \tag{17}$$

Eq. 16 is obtained by placing the denominator or of Eq. 17 equal to zero, and at the $\Omega_\infty$ point, the attenuation becomes infinity.

The fact that a polarized type electromechanical filter can be constructed in a simple manner by introducing such electrical elements as a capacitance, or a stray capacitance between lead wires 1 and 3, etc. is also one of the unique features of this invention.

Calculations based on approximate solutions of vibrational displacement, etc., have been shown for the case of rectangular plate vibrator, but the concept is equally applicable to the circular or other plates of more complicated construction presented in the illustrative embodiments.

The principle of the thickness shear electromechanical filter according to the invention now having been described, a few illustrative embodiments are presented below.

FIG. 2(A) shows an embodiment wherein a rectangular plate is used. The crystal plate $1a$ having dimensions designed according to the principle described is provided with electrodes 2, 3, 4, and 5. In effect, a common electrode, not divided, is used for 4 and 5. The electrodes 2 and 3 which are formed by division, are connected to input terminal 6 and output terminal 7, respectively.

A feature of this simplified construction is easy fabrication. The crystal plate shown in FIG. 2(B) is the same as that of FIG. 2(A) except that the dimension perpendicular to the transmission direction is very small. An important feature of this case, where the transmission direction is taken on the X-axis is that the dimension in the Z-axis direction is selected small enough to minimize the (1.1.1) vibration for utilization of vibration modes (2.1.0) and (1.1.0). This reduction in Z dimension is necessary because a square plate entails the presence of the resonance frequency of (1.1.1) mode between the (1.1.0) and (2.1.0) vibrations. However, this vibration of (1.1.1) mode cannot occur electrically provided that the electrode is attached exactly in the center, but if any error exists in this electrode position, some vibration may occur.

The crystal plate of FIG. 2(C) has a circular form. This is advantageous owing to its very large effect of suppressing other vibrations, easy fabrication, and reproducibility. The crystal plates of FIG. 2(D) and FIG. 2(E) are the same as that of FIG. 2(C), except that narrow cuts 20 are made on the circular plate as a means for suppressing other vibrations. As described hereinbefore, the thickness shear vibration is accompanied by numerous vibration modes represented by $pqr$, and the higher flexural vibration also has numerous resonance frequencies. For the suppression of these unwanted vibrations, narrow cuts made as shown in the figure are highly effective. Further, it is necessary to provide optimum electrode area by making the electrode smaller than the circular plate so that electrical excitation of unwanted vibration may be prevented. The crystal plate of FIG. 2(E) is provided with cuts of wedge form in place of the narrow cuts. The purpose is, here again, the suppression of unwanted vibration.

As to the effect of narrow cuts, wedge cuts, or cuts of other form, exact calculation by theory is difficult, but, experiments indicate that these cuts are effective for suppression of unwanted vibration.

Figure 5:
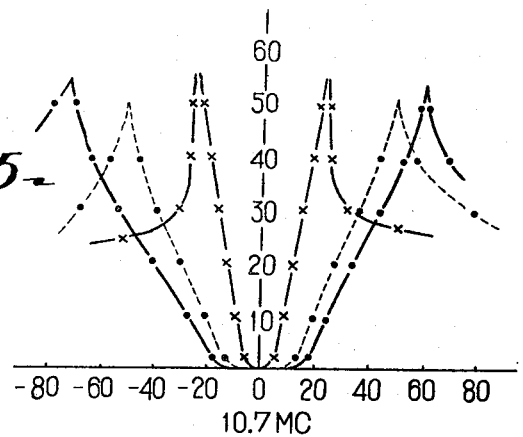
FIG. 5 is a graphical representation indicating examples of measured values relating to electromechanical filters according to the invention having various pass band widths.
Figure 6:
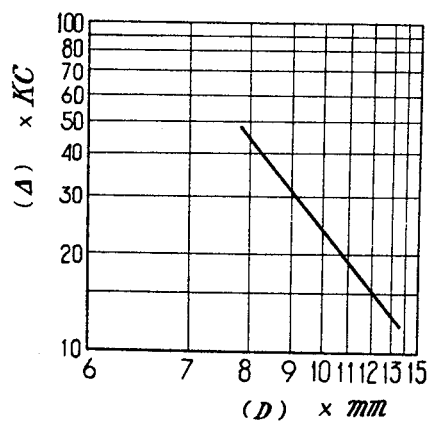
FIG. 6 is a graphical representation indicating one example of the relationship between the size of a crystal plate of the invention and the pass band width.

The results of measurement on the thickness shear vibration electro-mechanical filters constructed on the principles described and in the constructional forms shown, are presented in the following description. FIG. 5 is a graph of measured attenuation of a band bass filter of 10.7 mc. center frequency constructed by using a circular AT cut vibrator provided with suppression of unwanted vibration. The terminal impedance used is a resistance calculated by Eq. 8 for the center frequency. The thickness dimension of the crystal plate is approximately 0.156 mm. for the center frequency of 10.7 mc. The band width as a polarized type is 10 kc., 30 kc., or 40 kc., as determined by the diametric dimension of the crystal plate, and the relation is shown in FIG. 6.

In quite a manner similar to that of the general filters, several sections of such electromechanical filters are cascade connected to obtain the required amount of attenuation. The limit of maximum available band width of this filter is determined by the capacitance ratio P of Eq. 15. However, for wider band width, the design can be made with a parallel circuit of coil and capacitor connected between sections so as to compensate for $C_0$.

Since the basic material of a thickness-shear vibration electromechanical filter according to the present invention as described above is a crystal body, the said electromechanical filter is highly advantageous on such points as temperature characteristics, changes with time, frequency stability, frequency adjustment, high-frequency characteristics, losses, abrupt cutoff characteristics, Q value, and possibility of micro-miniaturization.

While the foregoing description has been presented entirely on the basis of a crystal body as the basic material, it will be obvious that the above-described operation, principle, and construction will be applicable with similar effect in the case wherein another substance of comparable characteristics is used.

Although this invention has been described to a few particular embodiments thereof, it is not to be so limited as changes and modifications may be made therein which are within the full intended scope of the invention, as defined by the appended claims.

What is claimed is:

1. A high frequency electromechanical band pass filter comprising a thin piezoelectric crystal having an X axis (electrical axis), Y axis (mechanical axis) and Z axis (optical axis) and having the characteristic of vibrating in the thickness shear mode of vibration with substantially all vibrational displacements in the X axis direction, said crystal having opposite parallel major faces, and a plurality of electrodes on said major faces, said electrodes comprising an input electrode and an output electrode on one of said major faces divided from one another along a center line perpendicular to the direction of the X axis or Y axis of said crystal with parallel edges of said electrodes spaced from one another, the outer dimensions of said crystal being selected to determine the desired center frequency and band width of said filter, and notches being provided in opposite edges of the perimeter of said crystal in line with the division between said input and output electrodes for suppression of unwanted vibrations.

2. A high frequency electromechanical band pass filter comprising a thin circular piezoelectric crystal having an X axis (electrical axis), Y axis (mechanical axis) and Z axis (optical axis) and having the characteristic of vibrating in the thickness shear mode of vibration with substantially all vibrational displacements in the X axis direction, said crystal having opposite parallel circular major faces and electrodes on said opposite major faces including a plurality of approximately semi-circular electrodes on one of said major faces, said electrodes being of materially smaller radius than said crystal and said semi-circular electrodes comprising an input electrode and an output electrode disposed on one of said major faces and having adjacent diametral edges spaced apart and approximately perpendicular to the direction of the X axis or Y axis of said crystal and to the direction of transmission from said input electrode to said output electrode, said piezoelectric crystal having an annular portion of appreciable radial dimension between said electrodes and the periphery of said crystal to suppress unwanted vibrations.

3. A filter according to claim 1, in which notches are provided in the perimeter of said crystal in line with the space between the diametral edges of said electrodes.

4. A filter according to claim 3, in which said notches extend inwardly substantially to the perimeter of said electrodes.

5. A high frequency electromechanical band pass filter comprising a thin circular piezoelectric crystal having the characteristic of vibrating in the thickness shear mode of vibration, said crystal having opposite parallel major faces, and a plurality of electrodes on said major faces comprising two approximately semicircular electrodes disposed on the same major face and having diametral edges spaced apart and parallel to a diameter of said crystal, notches being provided in the perimeter of said crystal in line with the space between said electrodes for suppression of unwanted vibrations.

6. A filter according to claim 5, in which said electrodes are of smaller radius than said crystal and said notches extend inwardly substantially to the perimeter of said electrodes.

References Cited

UNITED STATES PATETNS

| | | | |
|---|---|---|---|
| 2,037,171 | 4/1936 | Lane | 333—72 |
| 2,097,458 | 11/1937 | Hansell | 333—72 |
| 2,199,921 | 5/1940 | Mason | 333—72 |
| 2,300,075 | 10/1942 | Sykes | 333—72 |
| 2,284,753 | 6/1942 | Mason | 310—9.6 |
| 2,301,828 | 11/1942 | Stone | 333—72 |
| 2,306,909 | 12/1942 | Sykes | 333—72 |
| 2,309,467 | 1/1943 | Mason | 333—72 |
| 2,373,431 | 4/1945 | Sykes | 333—72 |
| 2,429,639 | 10/1947 | McSkimmin | 333—72 |
| 2,799,789 | 7/1957 | Wolfskill | 310—9.4 |
| 3,185,943 | 5/1965 | Honda et al. | 333—72 |
| 3,222,622 | 12/1965 | Curran et al. | 333—72 |
| 3,297,968 | 1/1967 | Fowler | 333—72 |

HERMAN KARL SAALBACH, *Primary Examiner.*

C. BARAFF, *Assistant Examiner.*